United States Patent [19]

Adamson, Jr. et al.

[11] 4,309,608

[45] Jan. 5, 1982

[54] FLIGHTLINE GOGGLE TESTER

[75] Inventors: James R. Adamson, Jr., Alexandria; Donald H. Jenkins, Fairfax, both of Va.

[73] Assignee: The United States of America as represented by the Secretary of the Army, Washington, D.C.

[21] Appl. No.: 150,463

[22] Filed: May 16, 1980

[51] Int. Cl.³ .............................................. H01J 31/49
[52] U.S. Cl. ..................................... 250/330; 250/333
[58] Field of Search ......................... 250/252, 330, 333

[56] References Cited

U.S. PATENT DOCUMENTS

| | | | |
|---|---|---|---|
| 3,833,805 | 9/1974 | Naiman et al. | 250/333 |
| 3,868,508 | 2/1975 | Lloyd | 250/333 X |
| 4,031,393 | 6/1977 | Redman | 250/333 X |
| 4,151,415 | 4/1979 | Lipke | 250/333 |

*Primary Examiner*—Davis L. Willis
*Attorney, Agent, or Firm*—Nathan Edelberg; Milton W. Lee; John E. Halford

[57] ABSTRACT

A compact modularized go-no-go resolution tester is provided for use with AN/PVS-5 image intensifier goggles. The tester can be quickly disassembled and reassembled by operators having little or no skill and training to replace broken or expendible parts thereof. Prior adjustments of the devices are not affected by disassembly and such adjustments are easily performed.

7 Claims, 9 Drawing Figures

FLIGHTLINE GOGGLE TESTER

The invention described herein may be manufactured, used, and licensed by the U.S. Government for governmental purposes without the payment of any royalties thereon.

BACKGROUND OF THE INVENTION

1. Field of the Invention

The invention relates to a family of devices which use image intensifier tubes. Early versions of these tubes used electron optics between a photocathode and a phosphor screen anode to produce intense images of objects at extremely low ambient light levels. The electron optics are now being replaced with thin microchannel plates which greatly reduce the size and weight of the tubes and provide other advantages as well.

2. Description of the Prior Art

To test the above devices rigid standards have been adopted and sophisticated test equipment has been evolved. This insures that only devices in top working condition are issued to the field, at least in military situations. Once the devices are in field use the situation is quite different. The degradation of performance of the devices can be quite subtle. An operator in the field may be unable or unwilling to accept that such degradation has taken place, for a variety of reasons and could thereby compromise an important mission. In order to improve this situation applicant devised a field test unit for a variety of intensifier devices which could be used in the field. This tester is disclosed in patent application Ser. No. 818,264 for a "VISIBLE IMAGE PERFORMANCE MONITOR," filed July 22, 1977. It utilizes a diffusing device disclosed in U.S. Pat. No. 4,149,228 issued Apr. 10, 1979 for a "COMPACT UNIFORM LIGHT DIFFUSER AND ATTENUATOR." This tester is ideal for ground units which use a variety of intensifier devices concentrated in a fairly small region. Exceptions to this are the devices used by airborne units and some motorized ground units. Popular devices used by both are the AN/PVS-5 goggles. A set of goggles comprises a mounting frame and two demountable oculars, each ocular having an objective lens, an image intensifier and an eyepiece in a tubular ocular housing. They are mounted on the headgear of the user and become dispersed over wide areas and in inaccessible places. Used in night flying and driving, they are probably much more critical than other devices on a moment by moment basis and receive greater useage. The tester described above is too cumbersome and expensive to be used in such service.

SUMMARY OF THE INVENTION

In order to meet the above need, applicant has devised a lightweight compact modularized test unit which can accompany one or a few pair of flightline goggles on a mission to insure that they are performing adequately. The tester requires no special training to operate. The modularized construction of the unit makes replacement of batteries, light source, in fact, any component simple to replace by even an unskilled user.

BRIEF DESCRIPTION OF THE DRAWINGS

The invention is best understood with reference to the accompanying drawings, wherein.

DESCRIPTION OF THE PREFERRED EMBODIMENTS

Figure 1:
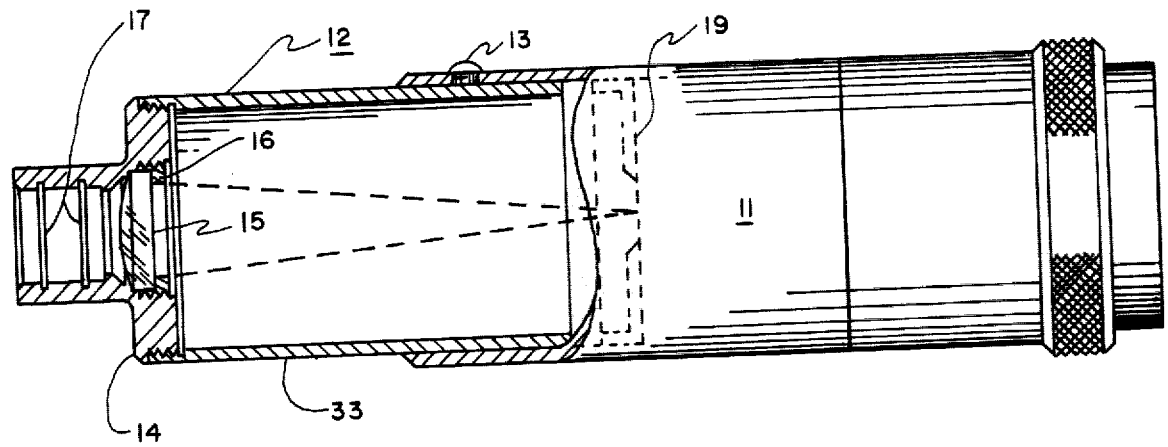
FIG. 1 shows a partially cutaway view showing the inner detail of the all optical portion of the tester.

As shown in FIG. 1 the tester housing consists mainly of two overlapping tubes 11 and 12 held in fixed position by one or more setscrews 13. The electronic housing tube 11 contains an artificially illuminated planar resolution target assembly including the active elements of the tester, while the collimator housing tube 12 is essentially empty. The left hand end of the collimator tube is extended by a hollow tubular adaptor 14 which threads into the tube 12. A collimator lens 15 is fitted into a threaded lens recess of the adaptor which opens into the collimator tube. A threaded keeper ring 16 is inserted after the lens to hold it in place. The opening in the opposite end of the adaptor is smaller in diameter than the lens recess to form a step therewith against which the collimator lens rests. The smaller diameter is slightly greater than the outer diameter of the objective lens tube or ocular housing on a pair of military goggles designated as AN/PVS-5. A pair of inner circumferential grooves 17 are provided in this portion of the adaptor so that a pair of O-rings (not shown) may be inserted between the goggle adaptor and the ocular housing to prevent light from leaking into the collimator tube 12. It may be necessary to drill a tiny hole through the goggle adaptor between the lens and the nearest O-ring to relieve the air pressure created as the goggles are inserted. The outer surface of the last element in the electronic housing 11 defines the absolute limit of the intrusion of tube 12 therein, however the collimator tube is always spaced from this element. The maximum diameter of the housing tube is approximately three times the outer diameter of the objective tube or aperture of the goggle. The length of the collimator and the nonoverlapping length of the electronic housing tube are about twice their diameter making their combined length about four diameters or 12 inches.

Figure 2:
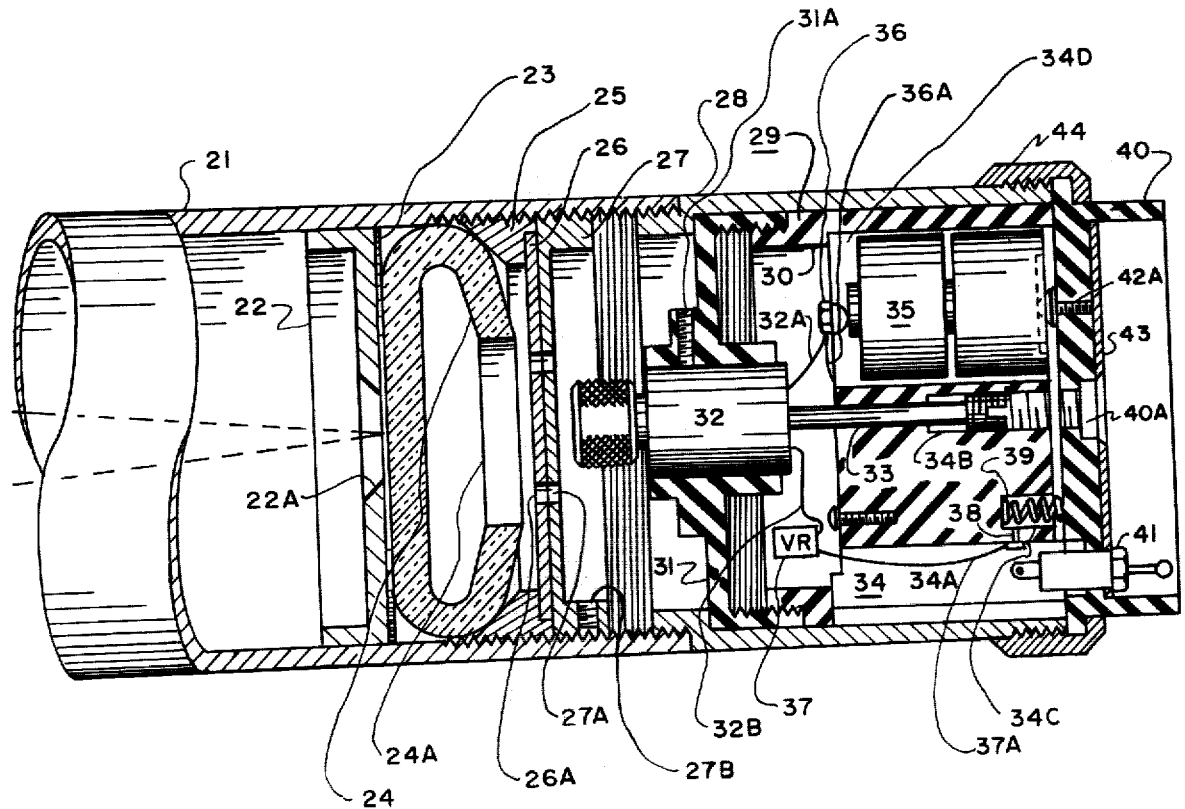
FIG. 2 shows a cutaway of the remaining portion of the tester including the electronic portions thereof.

Referring to FIG. 2 the active elements of the tester are shown. The housing tube 11 includes a first diffuser housing member 21 with an aperture cup 22 which is the above mentioned last element and defines aperture 22A. This cup is screwed, welded or otherwise permanently secured to the diffuser housing member. A glass slide 23 is placed against the cup 22. The slide carries a standard resolution chart such as a 30 percent transmission 1951 Air Force bar pattern, group o element 3 which is confined to the surface area defined by the aperture 22A. A diffusing cup 24 presses against the opposite slide surface and is in turn held in place by diffuser retaining ring 25 which threadably engages the extended internally threaded inner end portion of the housing member 21. The diffuser and complete bar pattern is described in applicants aforementioned patent and operates to transmit and diffuse light falling on the circular cylindrical aperture surface 24A thereof and emit that light only at the surface area thereof adjacent aperture 22A.

Figure 3:
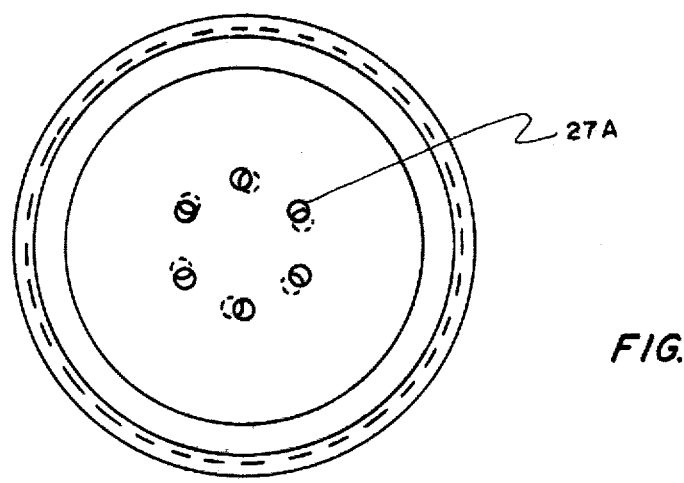
FIG. 3 shows a normal view of the light shutter or attenuator from FIG. 2 as seen from the adjacent end of LED housing 32.

To limit the light reaching the diffusing cup a disc shaped masking plate 26 is mounted in a stepped recess of the diffuser retaining ring 25. The plate may be screwed, welded, keyed or otherwise secured to ring 25 to prevent its rotation. Illumination of cup 24 is limited to a series of normally drilled cylindrical holes 26A in the masking plate having their centers concentrically arrayed on a circle having a normal center axis coaxial with said circularly cylindrical surface 24A and a radius which is about two-thirds that of surface 24A. The illumination of surface 24A is further limited by a shutter cup 27. The thick side wall of this cup is externally threaded to engage the internal threads on diffusing housing member 21 and the flat bottom contains a series of holes 27A which are equal and coincide with apertures 26A when the shutter is rotated thirty degrees from a snug fit against diffuser retaining ring 25. The diameter chosen so that a thirty degree rotation of shutter cup 27 to the snug position just defined will eliminate all or a substantial amount of the overlapping cross section of these holes. To prevent accidental rotation of the shutter, an aperture 27B is drilled and tapped through the sidewall for a standard nylon tipped setscrew (not shown) which engages the diffuser housing member 21 on the inner surface or may extend through a slot (not shown) in member 21 (if light leaks are avoided), so that the shutter and setscrew can be adjusted and locked externally. FIG. 3 shows a typical arrangement of six holes which is easily fabricated.

Returning to FIG. 2, a second open tubular power supply housing number 28 is threaded into the first housing member 21 and provides a short stepped portion of lesser diameter where the two members overlap. A combined modular structure 29 consisting of power-supply and illumination modules 30 and 32 each of generally circularly cylindrical configuration slides snugly into the remaining open end of the second power supply housing member and rests against the stepped portion thereof. The housing for the power supply module 30 is preferably made from a high impact plastic such as NOREL which also provides good electrical insulation. The power supply module consists of a generally circularly cylindrical battery case 34 with a guide cap 31 and a backing plate 40. The guide cap is coaxially threaded over one end of the battery case and has a thick central portion which is apertured to provide a guideway for the circularly cylindrical illuminator module 32, so that it remains coaxial with the other housing members and diffuser 24 but can be moved axially. The illuminator module is positioned axially by means of a stem 33 which is axially fixed at one end in that module, but rotatable with respect thereto, and is similarly captured at the opposite end in the battery case, but is threaded into the latter so that rotation of the stem produces a gradual axial movement of the stem and illumination module. The threaded end of the stem 33 is slotted or otherwise configured to receive an adjusting tool in the usual manner well known in the art. A setscrew mounted in the tapped hole 31A of the guide cap engages module 32 to prevent rotation (as will be described at FIG. 4) during adjustment. The battery case has a thick transverse wall structure extending axially over 60-80% of the interior axial length of the case and spaced a few percent of that length from end plate 40 to leave a sizeable voltage regulator (VR) recess under guide cap 31. The walled portion of the case has large exterior side grooves 34A which lighten the case and open into the VR recess. There are also large round holes extending parallel to the axis which each accommodate two 2.7 volt batteries 35. A battery contact structure 36 is mounted on the battery case wall facing the VR recess and extends to the center of the battery terminal. A lead 36A extends from this terminal into one of the grooves 34A. As will be seen there is a total of six batteries series connected to supply 16.2 volts.

To reduce the above voltage to a steady working voltage of 9.5 volts, a voltage regular comprising one or more miniresistors, minicapacitors and an IC circuit, numerous configurations of which now are found in voltage regulator handbooks, is mounted in the VR recess. One of the illuminator module leads 32A is connected to negative battery contact 36 and the remaining lead 32B is connected to the positive terminal of the voltage regulator (VR). The input terminal lead 37A from the voltage regulator is connected to a screw 38 which extends through the transverse wall portion of the battery case in groove 34A into a small blind cylindrical recess 34C opening out of the transverse wall opposite end plate 40. The screw 38 contacts a small conducting spring 39 that in turn presses against a contact which will be described on back plate 40.

Control elements such as switch 41 are mounted through the back plate using a number of normally drilled holes therethrough. Some of the holes like 40A are tapped. A plastic dust cover (not shown) is placed in this hole when it is not needed as a screwdriver access for adjustment of stem 33. Other screws like 42A are mounted to serve as terminals or to hold terminals in place. A nomenclature plate 43 may be placed over the backplate to cover the exterior end openings of holes like those containing screw 42A that are not used externally. If the plate 43 is metal, which is preferred for its scratch resistance, screws like 42A must be short enough to avoid touching the plate. Otherwise this plate must be made of insulating material or a composite material such as LAMICORD. The entire power supply and illuminator assembly is finally held in place with a threaded end ring 44 which screws over the end of housing member 28.

Figure 4:
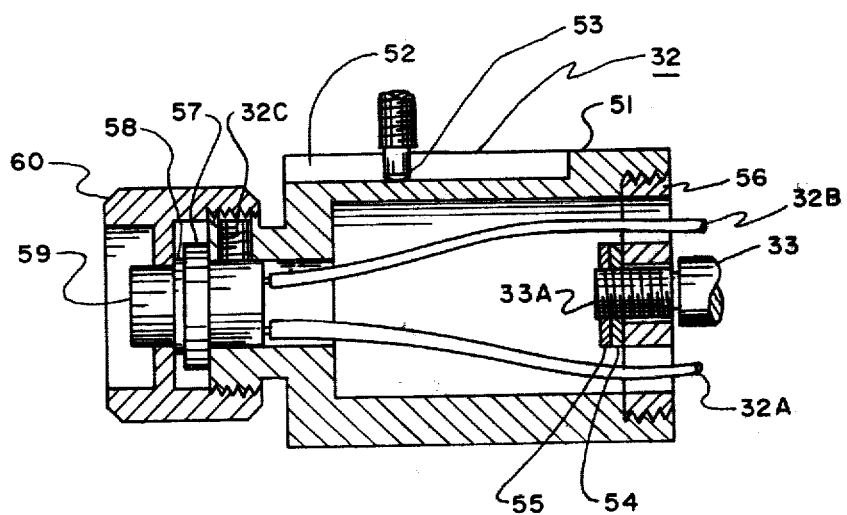
FIG. 4 is a cutaway view through the LED housing and its cap showing the arrangement of elements therein.

FIG. 4 shows the inner detail of the illumination module 32. The main housing member 51 has a long cylindrical portion with a large inner and outer diameter and a short cylindrical portion having an outer diameter about equal to the inner diameter of the long portion. The larger end is counter bored and tapped to provide a bearing recess and an apertured metal bearing plate 56 threaded into the recess. The smaller portion is threaded on the outside. A slot 52 is milled parallel to the axis along the side of the module to accept a setscrew pilot 53 projecting from hole 31A of FIG. 2. This prevents rotation of the module 32 during an axial adjustment of stem 33 and prevents twisting of the leads 32A and 32B. The bearing plate is provided with a center hole of slightly larger diameter than the threaded end 33A of stem 33 but a smaller diameter than the adjacent unthreaded portion of the stem and is inserted thereon. Diametrically opposed holes are also provided in the bearing plate for leads 32A and 32B. A pair of nuts 54 and 55 are placed on the exposed threaded end of stem 33. Nut 54 is first tightened to press plate 56 against the step in stem diameters and backed off just enough to permit free rotation of the stem in the bearing plate. Nut 55 is then tightened against nut 54. Leads 32A and 32B are then fed through the bearing plate and the latter secured in its recess. The leads 32A and 32B are provided by a standard LED socket of generally cylindical design. The smaller inner diameter of housing member 51 snugly fits the small diameter base of the socket 57 which is fully inserted therein and secured by one or more setscrews 32C. The infrared LED 59, which like the above socket is a standard component also used in the goggles themselves is then plugged into the socket. To prevent axial movement of the LED a cap 60 is provided. The cap is generally circularly cylindrical. A cup shaped recess is provided in both axial ends, the deeper recess being threaded to mate with the outer surface at the small end of housing member 51. The circular transverse cap wall between the two recesses is coaxially bored through to admit the small diameter top of the LED the larger diameter LED should being trapped between the cap and the housing.

Figure 5:
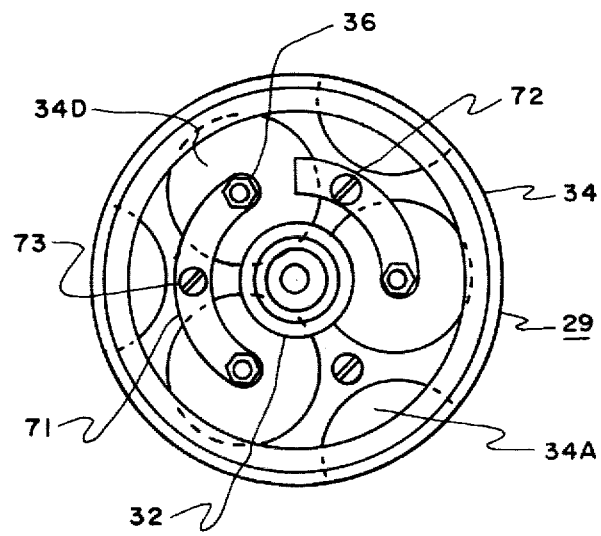
FIG. 5 shows a front end view of the light source and power supply module 29 in FIG. 2 as viewed from the light shutter with end caps 31 and 40 and batteries removed and some inner detail omitted.

In FIG. 5 the battery case is seen from the illuminator module end. The shape of grooves 34A are clearly seen as well as the battery holes 34D. A series terminal strip 71 is provided to interconnect two pairs of batteries in series and a ground terminal 72 is provided for the third pair. Three symmetrically located tapped holes are provided on the same radius as the axis of the battery holes to accept the terminal screws 73. One screw is uncommitted and may be used to mount the voltage regulator, which generally have a mounting tab or heat sink for this purpose.

Figure 6:
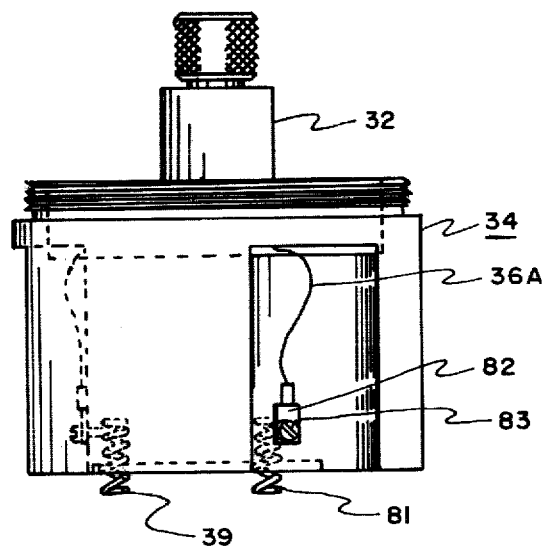
FIG. 6 shows a side view of the module of FIG. 5.

FIG. 6 shows the side view of FIG. 5. In this view a second spring 81 can be seen which like spring 39 presses against the back plate in the assembled tester. A lug 82 and screw 83 are provided as with spring 39 to provide electrical communication between the spring and a groove like 34A. Lug 82 is soldered to lead 36A from the negative or ground terminal 72. The opposite end of lead 36A is identical to that shown and is fastened by one of screws 73. As previously stated spring 39 is connected to the input terminal of the voltage regulator.

Figure 7:
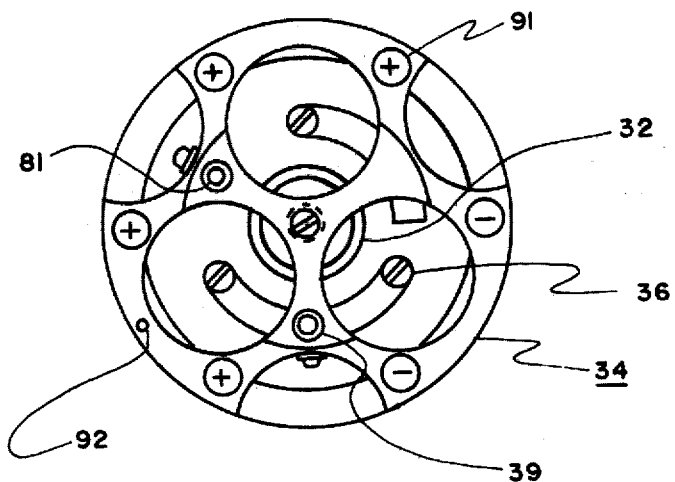
FIG. 7 shows the opposite or rear end view of the module of FIGS. 5 and 6.

FIG. 7 shows the opposite end of the battery case from that shown in FIG. 5. For convenience the battery holes are bracketed with their proper polarities to facilitate battery replacement. An indexing hole 92 is also provided near the periphery of the case to aid in aligning the back plate with spring contacts 39 and 81.

Figure 8:
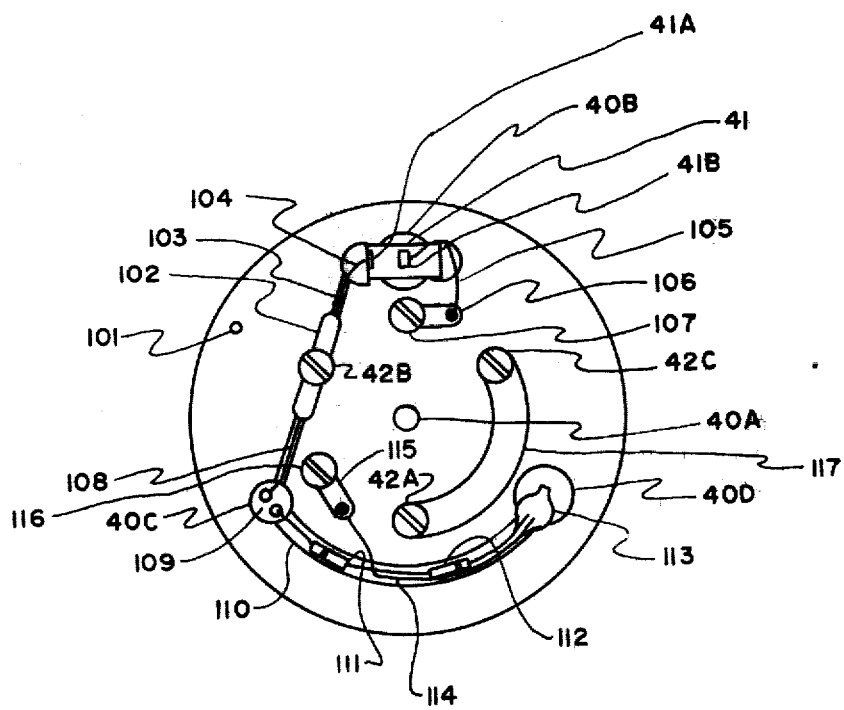
FIG. 8 shows a normal view of the end cap for the module in FIGS. 5, 6 and 7 as viewed from inside the module.

FIG. 8 shows the structure of the backplate as seen from the spring contact end of the battery case. A pin 101 aligns the various contact terminals on the back plate when inserted in the index hole 92 previously mentioned. Contacts 42A, B, and C are centered on the same radius as the center of the battery holes and coincide therewith to contact the center terminals of the batteries. A lug 102 is captured by screw 42B and is soldered to lead 104 which is recessed in groove 103, the latter extending under screw 42B from hole 40B to 40C in the backplate. Lead 104 is connected to terminal 41A of switch 41 from FIG. 2. Terminal 41B is connected to lead 105 and thereby to screw terminal 107 which mates with spring 39 in FIG. 7. Lead 108 is attached like lead 104 to terminal 42B, the positive end of the series batteries, and to one terminal of a push button normally open switch 109 extending through hole 40C in the backing plate 40 and manually operated from the opposite side. The remaining terminal of this switch is connected to the cathode lead of a diode 111 recessed in groove 110. The anode lead of that diode is connected to one end lead of a current limiting resistor 112 likewise recessed in the backplate. The remaining lead of the resistor is connected to one lead of visible light emitting diode 113 viewed on the opposite side of backplate 40 through hole 40D. The remaining lead 114 of diode 113 is soldered to lug 115 and fastened to screw terminal 116, which mates with the negative spring contact 81. Terminal strip 117 interconnects terminals 42A and 42C to complete the series connection of all six batteries in the assembled testor.

Figure 9:
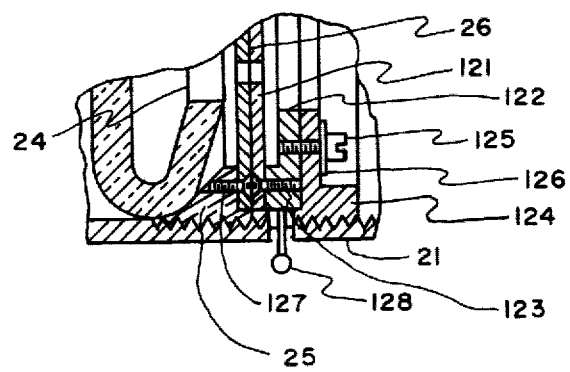
FIG. 9 shows an alternate mounting arrangement for the light shutter.

FIG. 9 (under FIG. 4) shows an alternate structure for the shutter of FIGS. 2 and 3. Instead of the shutter cap of FIG. 2 a disc-shaped plate 121 having a slightly smaller diameter is used. A thicker shutter backing ring 122 of L-shaped cross-section and equal maximum diameter is attached by screws 123. Ring 122 is also drilled and tapped to accept a set of mounting screws 125. These screws which lock hold and lock the shutter are carried by another larger diameter L-shaped shutter support ring 124 having exterior threads to mate with the housing member. Ring 124 has a series of circumferential slots 30° long for screws 125 to permit the shutter operation previously described. The housing may also contain a circumferential slot adjacent member 123 to accommodate a pin 128 extending therefrom to permit exterior adjustment of the shutter in the assembled tester. Pin 128 need not be permanently attached, but may fit into a smooth or threaded socket for easy removal after calibration of the tester is completed. The support ring 124 is preferably recessed slightly so that the backing ring 12 can nest therein for accurate centering of shutter. If pin 128 is used care must be taken to prevent leakage of ambient light into the tester, otherwise this pin and its slot should be omitted.

The housing members and other parts of the tester unless otherwise specified are preferably made of aluminum to reduce overall weight. Mounting screws and setscrews are preferred to adhesive or welding of nonadjustable parts to facilitate repair and replacement. It is preferred that all parts be circularly cylindrical to facilitate their manufacture, but other cross-sections can obviously be used. The source of light for the compact diffuser 24 is a light emitting diode which radiates only in the near infrared portion of the spectrum. This is an important design feature of the tester since the photocathode sensitivity of a goggle intensifier tube decays 1½ times faster in the near IR region than in the visible region, thereby allowing earlier detection of tube degradation. To explain this last statement, if an intensifier tube's performance is off by 10% when viewing the real world, its performance will be off by 15% when viewing a resolution pattern in the tester that is backlit only by near IR illumination.

In operation, the tester works as follows: A check is made on the condition of the self contained power supply just prior to the start of the test. This is accomplished by depressing the battery test button 109 which is recessed in the power supply backplate. If there is sufficient voltage to operate the current regulator that supplies the infrared LED source, the visible LED indicator 113 will glow. The tester is then switched on and the operator removes one of the oculars and its objective lens cap from the goggle to be tested. That ocular objective is next inserted in the adaptor of the test unit and the objective focus of the goggles is placed in the infinity position. After the operators eye becomes dark adapted, the eyelens focus can be optimized. If there is difficulty in achieving focus, the ocular objective can be extracted from the tester; a distant scene viewed, and the eyepiece focused. In the event there is too much light present, the objective lens cap has a pinhole in it and will allow the goggle objective lens to view a daylight scene. Upon reinsertion of the goggle to tester, the operator should be able to resolve the bar test pattern. This test pattern, which is vacuum deposited on a 1/16th inch thick preferably round glass slide; has three vertical and three horizontal bars, has 30 percent contrast and has a five (5) to one (1) aspect ratio, that is, the overall height of the pattern is five (5) bar widths high and there is a one bar width gap between the bars. The single group pattern selected provides a double check feature. Due to the low contrast of the pattern and low light level that is calibrated into the tester, resolution of the test image is going to be marginal at times, but if the person conducting the test can correctly identify the direction of the vertical and horizontal bars, the ocular under test would be considered good. The bar's orientation relation to the outside of the tester housing is recorded during assembly of the tester and can be easily checked or changed by a second party to the test.

Calibration of the tester is accomplished by removing the power supply, and illuminator module, if necessary, and setting the shutter to an arbitrary position; then reassembling the tester and adjusting the LED housing in or out by means of the stem. To affect calibration, an 18 mm second generation image intensifier tube having a typical S-25 multi-alkali photocathode is used as a transfer standard. Luminous gain measurements are made on the image tube with white light input illumination of the photocathode of $5 \times 10^{-6}$ FC$\pm 15\%$. The tube is then mounted with a goggle objective lens and inserted into the Flightline tester. The tester calibration adjusts (shutter and stem) are made until the output of the image intensifier tube matches the output that was obtained when the tube phosphor had previously been measured with a white light illumination of $5 \times 10^{-6}$ FC for the photocathode. Once these calibration adjusts have been initially set, the LED light source can be replaced in the field with LED sources of similar output characteristics ($\pm 15\%$ output energy) without detrimentally affecting the initial calibration.

Many variations of the above testing devices and methods will be immediately obvious to those skilled in the art, but the invention is limited only as specified in the claims which follow.

We claim:

1. A hand held test device for image intensifier goggles comprising:
    a first tubular electronic housing having an open end, a closed end and a maximum cross-sectional dimension substantially limited to three times the diameter of the objective aperture of said goggles;
    an artificially illuminated planar resolution target assembly extending axially no more than twice said maximum dimension, mounted in said first housing and contacting said closed end;
    a second tubular optical housing having an outer cross-section similar to but slightly smaller than the inner cross-section of said first housing, said second housing being no longer than twice said maximum dimension and slideably telescoped into said open end;
    an adaptor at the exposed end of said second housing to receive an objective lens mounting tube of said goggles; and
    a lens means mounted in said second housing between said adaptor and said target to collimate the light from said target before it reaches said adaptor.

2. A test device according to claim 1 wherein:
    said illuminated target assembly includes a light emitting diode.

3. A test device according to claim 2 wherein:
    said diode emits light only in the near infrared region of the light spectrum.

4. A test device according to claim 1 wherein:
    said illuminated target assembly includes a light attenuator consisting of two superposed relatively rotatable discs having identical patterns of holes.

5. A test device according to claim 2 wherein:
    said illuminated target assembly includes a light attenuator consisting of two superposed relatively rotatable discs having identical patterns of holes.

6. A test device according to claim 3 wherein:
    said illuminated target assembly includes a light attenuator consisting of two superposed relatively rotatable discs having identical patterns of holes.

7. A method of testing an image intensifier by utilizing a resolution tester having a resolution target of vertical and horizontal bars, comprising the steps of:
    viewing the resolution target through an image intensifier ocular objective lens under test for a period of time sufficient to allow the operator's eye to become dark adapted;
    illuminating the resolution target with light exclusively lying in the near infrared region of the light spectrum;
    adjusting the eyelens focus for operator's optimum clarity;
    identifying the direction of the vertical and horizontal bars to ascertain the condition of the test unit, wherein the extent to which the direction of said bars can be correctly identified is indicative of the performance capability thereof.

* * * * *